United States Patent
Norcott et al.

(10) Patent No.: US 6,842,785 B1
(45) Date of Patent: Jan. 11, 2005

(54) ENTERTAINMENT AND INFORMATION SYSTEMS AND RELATED MANAGEMENT NETWORKS FOR A REMOTE VIDEO DELIVERY SYSTEM

(75) Inventors: Alfred A. Norcott, Vienna, VA (US); Donald E. Decker, Peoria, IL (US); Dennis M. Owens, Peoria, IL (US)

(73) Assignee: SVI Systems, Inc., Peoria, IL (US)

( * ) Notice: Subject to any disclaimer, the term of this patent is extended or adjusted under 35 U.S.C. 154(b) by 775 days.

(21) Appl. No.: 09/736,680

(22) Filed: Dec. 13, 2000

Related U.S. Application Data

(60) Continuation-in-part of application No. 09/421,156, filed on Oct. 19, 1999, now Pat. No. 6,167,443, which is a division of application No. 08/589,727, filed on Jan. 22, 1996, now Pat. No. 6,009,465.

(51) Int. Cl.[7] ............................................. G06F 15/16
(52) U.S. Cl. ...................... 709/229; 709/224; 709/225; 709/231
(58) Field of Search ................................. 709/224, 225, 709/229, 231

(56) References Cited

U.S. PATENT DOCUMENTS

| | | | | | |
|---|---|---|---|---|---|
| 5,412,416 | A | * | 5/1995 | Nemirofsky | 725/36 |
| 5,521,631 | A | * | 5/1996 | Budow et al. | 725/78 |
| 5,638,426 | A | * | 6/1997 | Lewis | 379/90.01 |
| 5,781,734 | A | * | 7/1998 | Ohno et al. | 725/115 |
| 5,835,126 | A | * | 11/1998 | Lewis | 725/83 |
| 6,243,743 | B1 | * | 6/2001 | Freeny | 709/217 |

* cited by examiner

*Primary Examiner*—Saleh Najjar
(74) *Attorney, Agent, or Firm*—Banner & Witcoff, Ltd.

(57) ABSTRACT

A remote video delivery system transmits video and text from a hotel office to hotel rooms. A series of video players generates the video signals to modulators. The modulators transmit the signals on various frequencies. A system controller directs the signals from the modulators to the appropriate converter boxes within the rooms. An outside vendor runs a billing system to charge the guests for the video delivery without the need for involvement by the hotel staff.

20 Claims, 6 Drawing Sheets

ENTERTAINMENT AND INFORMATION SYSTEMS AND RELATED MANAGEMENT NETWORKS FOR A REMOTE VIDEO DELIVERY SYSTEM

RELATED APPLICATIONS

This application is a continuation-in-part of Ser. No. 09/421,156 filed Oct. 19, 1999 now U.S. Pat. No. 6,167,443, which is a division of Ser. No. 08/589,727, filed Jan. 22, 1996, now U.S. Pat. No. 6,009,465. This application claims the benefit of priority of these applications and incorporates these applications by reference in their entirety.

FIELD OF THE INVENTION

The present invention relates to entertainment and information systems and related management networks and, more particularly, to such systems which provide for communication permitting remote operations.

BACKGROUND OF THE INVENTION

In the hotel industry, there is a continual need to provide as many services for the guest as possible in the most convenient manner. (The word "hotel" in this application refers to any multi-user establishment including hotels, motels, hospitals, airplanes, etc.) In addition, there is the continual need to provide such services to the guest in the most efficient manner. (The word "guest" or "user" in this application refers to any user of the entertainment and information system described herein.)

When video cassette players and tapes were introduced to the consuming public as a whole, some hotel establishments installed individual video cassette players in their guest rooms so that their guests could privately view movies. However, such arrangements were cumbersome and required the hotel guest to walk to the movie rental location in the hotel or elsewhere and rent the video. Then, upon viewing the video, such arrangements typically required the hotel guest to return the video before departing.

Subsequently, systems were developed which could disseminate movie videos from a central location within a hotel to the rooms of the individual hotel guests as desired by the guests. Such systems were generally not developed or operated by the hotel establishment, but were developed, installed and operated by outside vendors. An example of such a system is set forth in U.S. Pat. No. 4,947,244 and the corresponding U.S. Reissue Pat. No. 34,611. Such systems were inherently flawed in that, among other things, they depended on the hotel for collecting revenues from the guests and for providing assistance to the guests as required. In addition, such systems required that a large staff of personnel be maintained to provide maintenance and other services as required.

In such prior systems, any charges generated by a particular room were either added to the hotel guest's bill electronically through an interface with the hotel's accounting computer or were automatically printed and manually entered by the hotel management onto the guest's acccount. Due to the expense of developing interfaces for every hotel's accounting system, such automatic systems are often impractical and not universally utilized. The manual method often led to a failure to post certain charges, and in some circumstances, incorrect amounts were charged by the hotel. In addition, unscrupulous hotel guests often fabricated problems in order to escape payment for services rendered. As a result, vendors experienced substantial problems with account adjustments and collections utilizing the prior systems. Moreover, in such systems, the vendor was dependent on the hotel or management company to reconcile invoices and to pay in a timely manner.

The limited resources and tight profit margins characterizing the operation of smaller properties exacerbated the above-mentioned difficulties. Further, the transaction costs of dealing with these properties were high. That is, because of an almost universal absence of single source property management, each hotel had to be dealt with on an individual basis.

Maintenance for such systems was performed on a regular basis by the vendor who would normally send a representative to the hotel location to change the selection of video choices and provide any maintenance which might be required.

If there were a problem during the daily operation of any particular system, the vendor would have to either rely on the hotel operator to fix the problem or provide a service staff near every installation. Of course, providing a maintenance staff near every hotel installation was so expensive that most vendors could not provide such services. Consequently, if a problem developed, the hotel would attempt to correct it or simply refund the movie system user's money. Even if the vendor were contacted in such situations, the vendor would typically be unable to provide any servicing of the system at the time unless a service representative happened to be at the location. Thus, in the majority of cases, the system would be out of service for a significant amount of time, even if the problem were relatively minor and could have easily been fixed by a trained service person.

An additional limitation with these systems was that the only service such systems provided to the hotel guest was the playing of videos. Such systems did not offer any services which required communications to any remote location such as a local food delivery establishment. Therefore, there has been a long-standing need for an entertainment and information system that would offer additional services as provided by the invention disclosed herein.

SUMMARY OF THE INVENTION

Accordingly, a primary object of the present invention is to provide an entertainment and information system in which the system's operation, service and maintenance may be controlled directly by the vendor at a remote central location.

Another primary object of the present invention is to provide a point of sale system which controls the presentation of video or audio programming, or the presentation or exchange of information, whereby the user pays for the entertainment or service at the time of use without requiring the involvement of the hotel.

Another primary object of the present invention is to provide an entertainment and information system which collects payment information and automatically communicates the information on a periodic basis to a central system for final processing.

A still further object of the present invention is to provide other services, such as direct ordering from local food vendors without additional in-room hardware.

Yet another object of the present invention is to provide an entertainment and information system which is easily and inexpensively installed and maintained, thereby making such systems applicable in a wide variety of establishments.

Still another object of the present invention is to eliminate virtually all hotel management involvement in the daily operation of an entertainment and information system.

A further object of the invention is to provide for the maintenance and altering of continuous promotional and advertising previews in a manner which permits efficient customization for individual hotels.

To achieve the foregoing and other objects, the present invention is generally directed to an entertainment and information system including a system controller which directs the connection of particular videos or other service items with individual rooms; a central operation for remotely maintaining and updating said entertainment and information system; a central billing operation for processing transactions centrally; and a communication link establishing communication between the entertainment and information system and the central operations or other remote systems.

Additional objects, advantages and other novel features of the invention will be set forth in the detailed description, drawings and claims which follow, and will become apparent to those skilled in the art upon examination of the following.

DETAILED DESCRIPTION OF THE PREFERRED EMBODIMENTS

Figure 1:
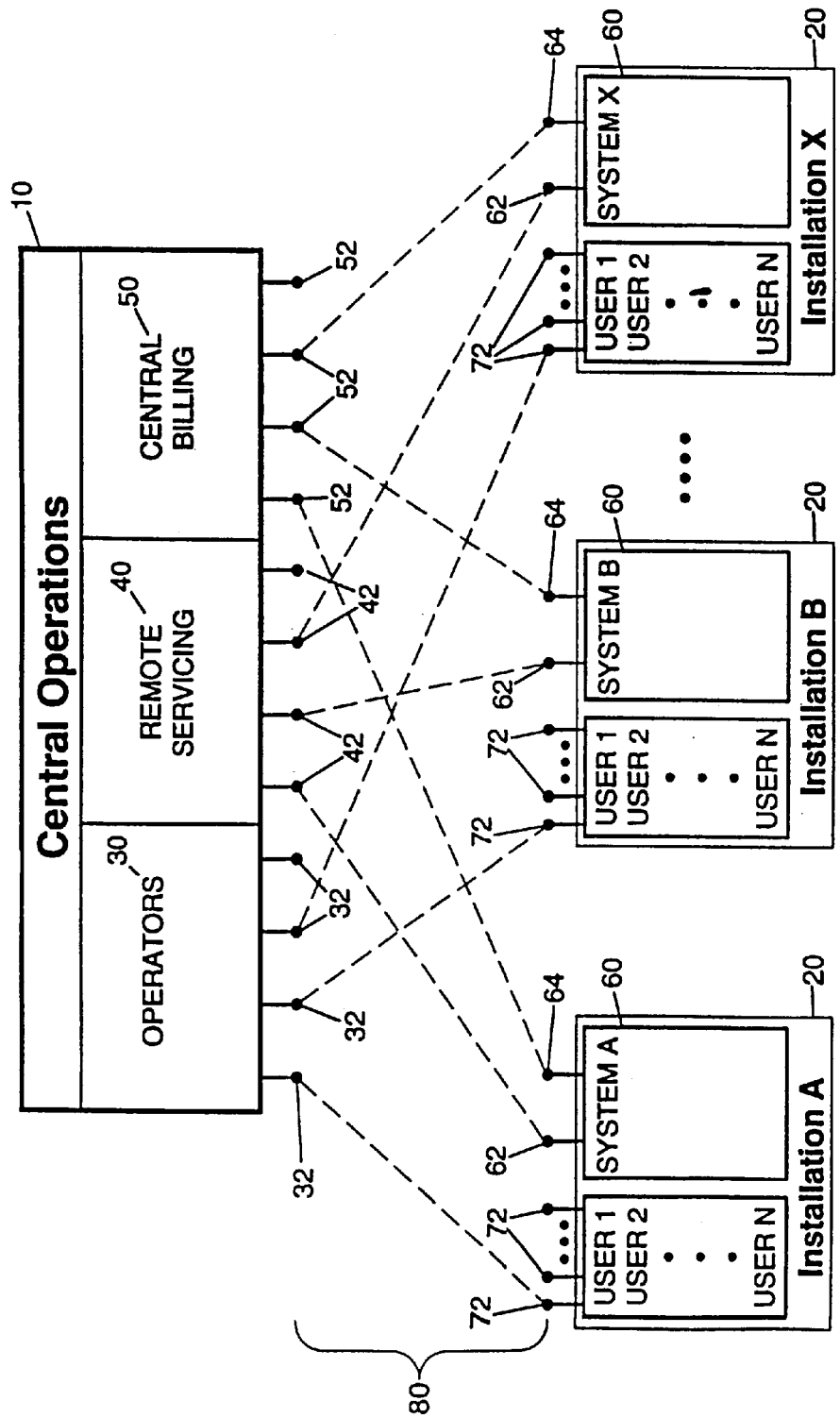
FIG. 1 is a diagram of the overall configuration of the present invention including the various individual system installations and the central operations in accordance with the preferred embodiment.

Referring to FIG. 1, the overall configuration of the multi-installation network system is depicted including vendor controlled central operations 10 and multiple installations 20. The central operations 10 includes operators 30, remote servicing terminals 40 and central billing operations 50. Each installation 20 of the individual entertainment and information system 60 is located at a hotel or another similar establishment. There may be any number of installations 20. Each system 60 includes a number of users (hotel guests) which varies from time to time. A bi-directional communication link 80 is established between the operators 30 and remote servicing terminals 40 and each installation. 20. The bi-directional communication link 80 may be any communication network, including, by way of example and not limitation, a public communication network, a private high-speed network or a satellite network.

In an exemplary embodiment, a user at a particular hotel installation 20 establishes communication with the central operations 10 by pressing a button on the accessory device associated with the telephone in the user's hotel room. Such a button may be marked as "help" or by some other appropriate designation. As explained in more detail in the section entitled "Operations" below, by pushing the appropriate button, the telephone automatically dials a central number to establish a connection between its line 72 and a line 32 at central operations 10. Once an individual user establishes a remote communication link 80 to an operator 30 at central operations 10, the operator 30 may then assist the user as required.

If it becomes apparent to the operator 30 (or other central service personnel including technicians, field service representatives and computer programmers, herein collectively referred to as "operators") that the particular system 60 requires service, the operator 30 may then use the remote servicing terminals 40 to establish a link 80 with the particular entertainment and information system 60. The service terminals 40 are provided with lines 42 which may establish links 80 with lines 62 of the systems 60. The Entertainment and Information System 10 communications are described in more detail in the section below entitled "Communications". As described below in "Remote Servicing and Maintenance", the operators 30 at central operations 10 may thereby communicate with the particular system installation 20 and perform diagnostic operations and maintenance thereupon.

While the operators 30 are contemplated to be actual persons, the system 10 could be modified to include an automated operator system. In such embodiment, the automated operator system would include multi-line voice technology applications made by Dialogic Corporation. The automated operator system would be controlled by a programmed microprocessor which would query the calling user to obtain critical information that could be utilized to direct diagnostic tests. Such tests would be initiated by a microprocessor through the remote servicing terminals 40. It is contemplated that such alternative system would include a voice simulator for speaking to the users and an input device which would comprise a voice recognition system or another form of input recognition such as telephone tone recognition. The automated operator alternative may also be configured to pre-process the incoming calls and then deliver the call to a human operator.

The central operations 10 further includes central billing operations 50 which receives and processes billing information from the various installations 20. Each system 60 includes a special line 64 which may create a data link 80 with lines 52 of the central billing operations 50. Such a link may be initiated by the individual system 60 or by the central operations 10. In the preferred embodiment, the system 60 accumulates payment information and periodically links with the central billing operations 50 to transfer the accumulated information. Such a system provides for automatic accounting of the multiple installations 20. This aspect of the invention is described in greater detail in the section entitled "Centralized Billing" below.

Figure 2:
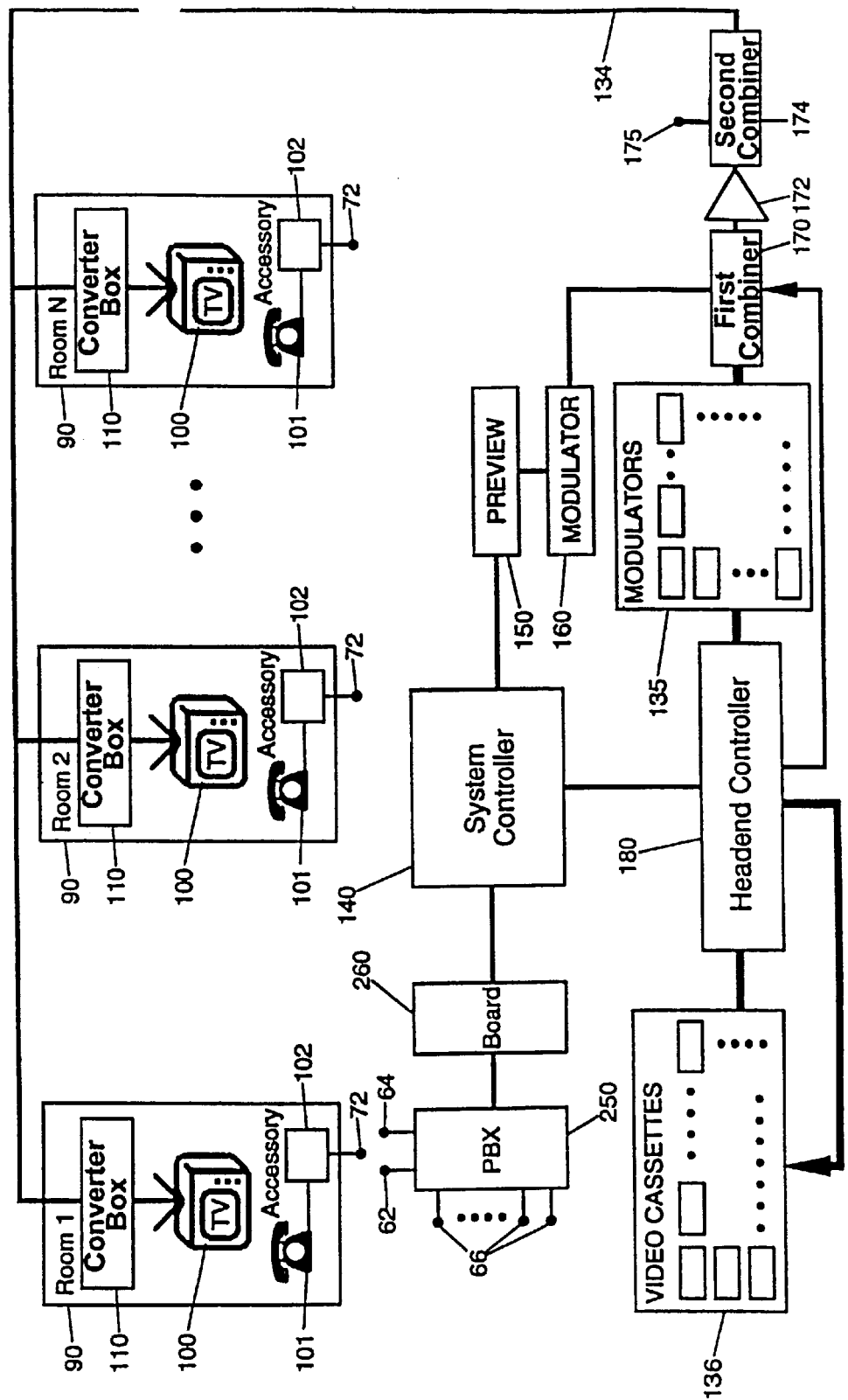
FIG. 2 is a diagram of an entertainment and information system according to the preferred embodiment.

FIG. 2 depicts an individual entertainment and information system 60 as installed in a particular hotel establishment. As shown, the hotel includes a number of rooms 90 for occupancy by users or hotel guests. Each room 90 includes a television 100, a telephone 101, a telephone accessory 102 and a converter box 110 which is coupled to a cable 134. The existing television distribution cable 134 connects each of the converter boxes 110 to the installation's entertainment and information system 60.

RF (radio frequency) modulators 135 operate to provide carrier signals for the video signals that the headend controller 180 routes to the input of the respective modulator 135. Since each modulator 135 is set to a preselected frequency or channel, connecting a particular video cassette player ("VCP") 136 or one of the headend controller's 180 menu generators 189 (shown in FIG. 4) to a particular modulator 135 results in the signal being transmitted over the cable 134 on the carrier frequency of the particular modulator 135. In this manner, the system 60 is not a dedicated frequency system (i.e., a system where each remote television is assigned a particular channel for receiving transmissions) but a flexible system based on the availability of modulators 135 and the programmability of converters 110. The channel modulators 135 are readily available cable television products which have been modified to alter the frequency positions of the RF carriers and to scramble the signals by switching the carrier frequencies of the specific video and audio signals. Alternatively, an active modulator 135 could be connected to each VCP 136 and could be operated in a manner similar to the approach (described below) which is used to operate the converters 110.

The coaxial cable 134 provides a multitude of channels and programming to the converter boxes 110. In addition to the regular channels that are generally provided in any geographic area called the "non-premium channels," the system has a "preview channel," a "control channel" and several "premium channels" which are used to transmit movies and other types of entertainment to the rooms 90. Transmissions on the control channel are generated by the system controller 140 and are converted to RF signals carried at 74.4 MHz by a system driver of the headend controller 180. Transmissions on the preview channel are generated by a preview player 150 and are modulated by a preview modulator 160 to the predetermined output channel (2, 3, or 4). The preview system is described in greater detail in the "Preview System" section below. In order to mix all of the channels which are provided by the system 60, two RF combiners are provided. The first combiner 170 combines the signals from the various modulators 135 with the signals from the preview modulator 160 and the RF control signal. After the modulated signals are combined by first combiner 170, the signals are amplified by amplifier 172. These modulated and amplified signals are then combined by second combiner 174 with the regularly provided cable or satellite delivered television signals 175, excluding either Ch. 2, 3, or 4, which is filtered out at each location. These further combined signals are then received by in-room converters 110, each of which selectively allows ssignals to be received by the television set 100 coupled thereto in a manner suitable for viewing.

Figure 3:
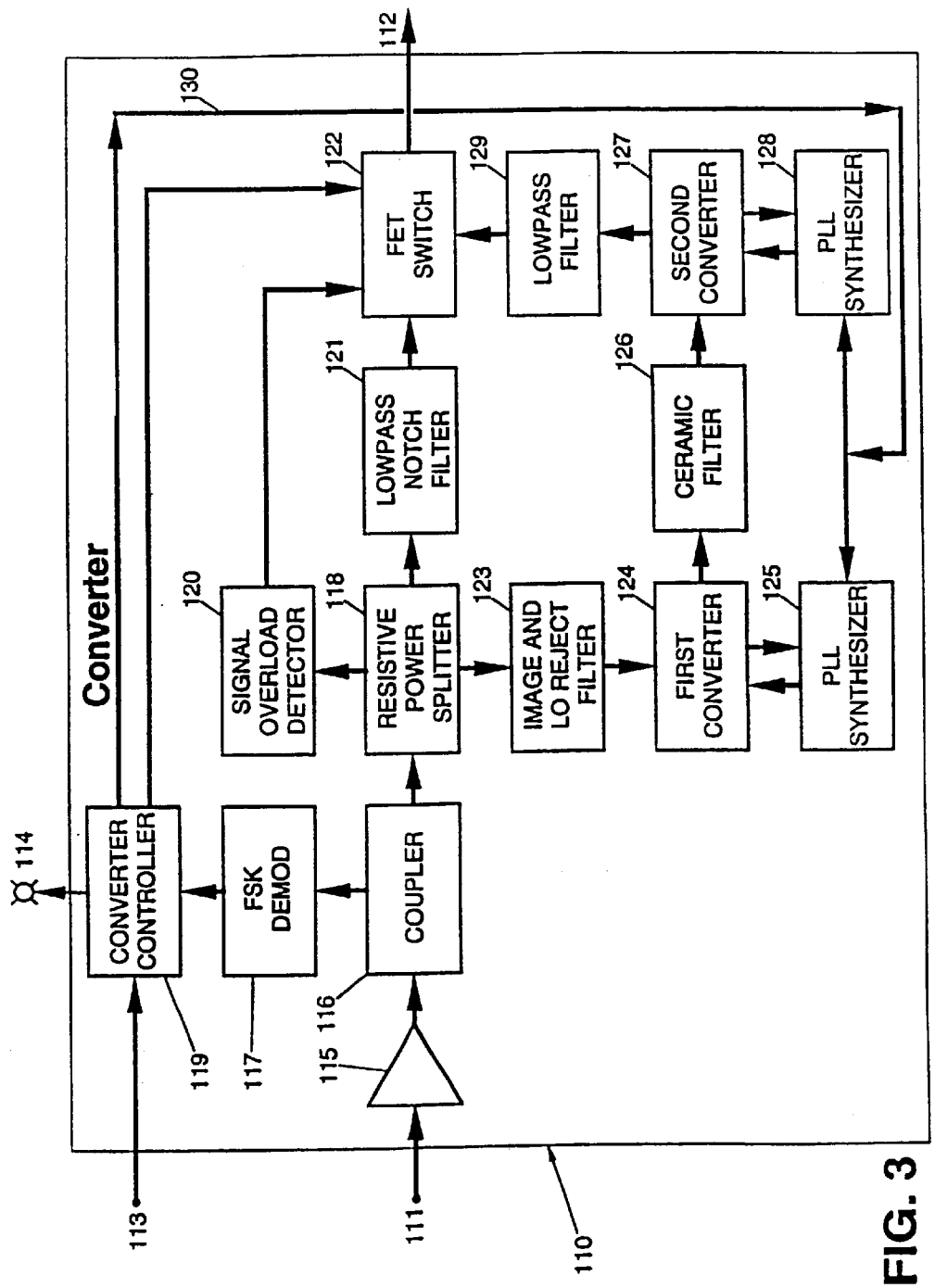
FIG. 3 is a schematic diagram of the preferred converter and its components.

Referring now to FIG. 3, the preferred embodiment of the converter 110 which is located in each room of the hotel establishment and connects the television 100 to the co-axial cable 134 is shown in greater detail. The converter 110 includes a converter input 111 which is connected to the co-axial cable 134; a converter output 112 which is connected to the televisions cable input; a program test port 113 for receiving commands and programming information directly from a portable computer; and, a LED status indicator 114 which indicates the current operating status of the converter by flashing in predetermined patterns. As noted above, the converter 110 receives a wide spectrum of signals at its input 111. The signals may be broken down into three general categories: (1) normal or standard NTSC (National Television Systems Committee) television signals on Channels 2–59 currently (referred to as "non-premium" channels herein); (2) scrambled NTSC television signals where the sound and picture portions of the signals have been reversed by modulators 135 (referred to as "premium" channels herein); and (3) control signals transmitted in the FSK (frequency-shift keying) format centered at 74.4 MHz.

Figure 4:
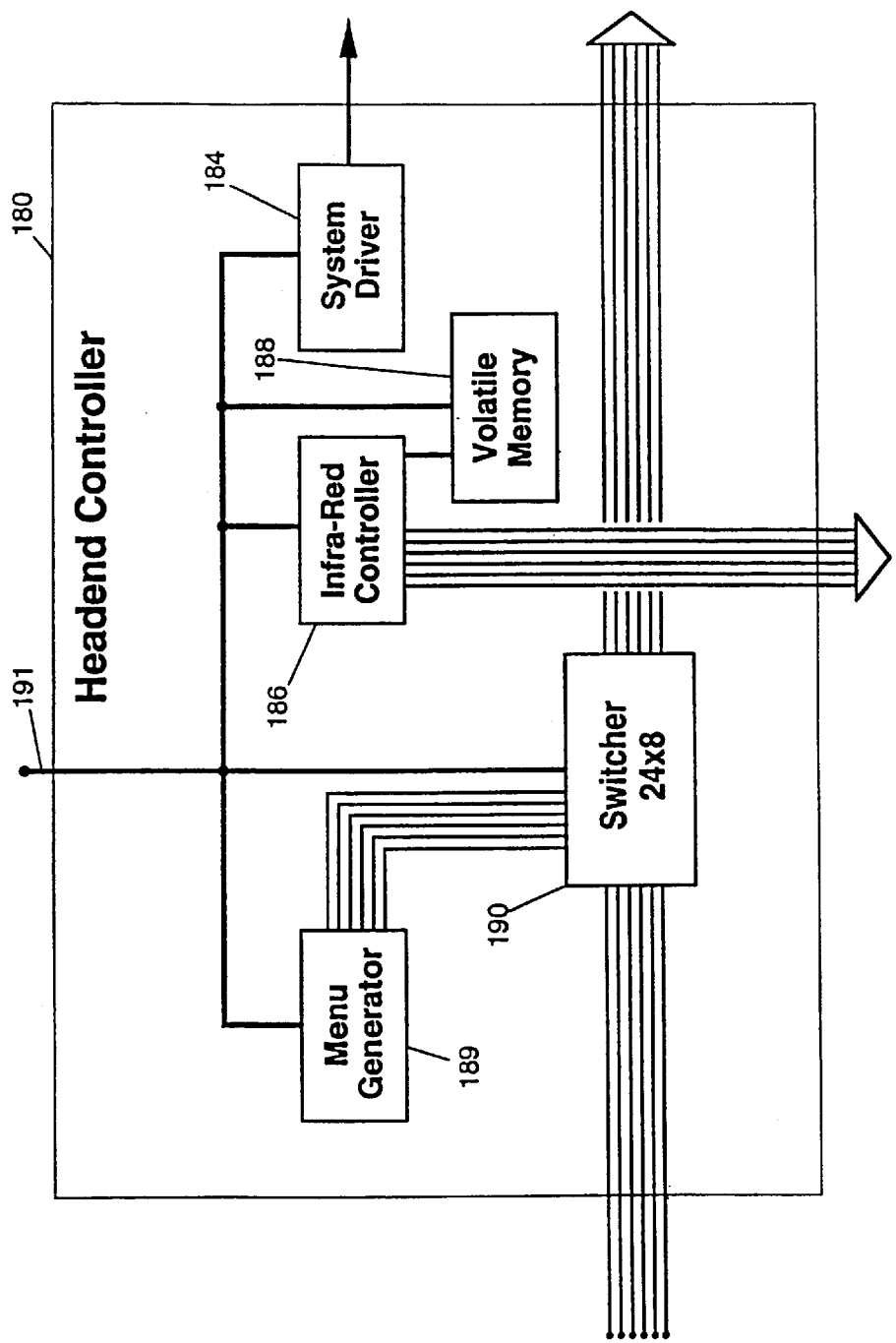
FIG. 4 is a schematic diagram of the preferred headend controller and its components.

The control signals provided at the input 111 are generated by the system controller 140 and then modulated by a headend controller 180 system driver 184 (shown in FIG. 4). The control signals may include data for changing the identification code of the converter 110 and data for transforming a particular premium channel for delivery to the output 112, among other things. Each control signal generally includes three portions. The first portion is essentially an addressing portion which comprises an identification code relating to one of the multiple converters 110. The second portion includes a control code which is directs the particular converter 110 to perform a particular function. The third portion of the control signal includes data required to perform the particular function. It will be understood that many other transmission formats may be utilized within the scope of the invention. In keeping with the above described control signal format, the "change converter identification" and the "play premium channel program" control signal formats are described next.

In order to change the identification of a particular converter 110, the system controller 140 sends a control signal over the cable 134 which generally comprises: (1) the command code for initiating a change of identification code; (2) the current identification of the converter 110; and (3) the new identification code for the converter 110. Of course, in such an operation, the new identification code is stored in the memory of the converter 110 and that converter will henceforth respond to command codes preceded by the new identification code. The reason for changing the identification code of a converter and the method for executing such a change are explained below.

When a user selects a premium program, the system controller 140 sends a control signal which generally comprises: (1) the identification of the selected converter 110 to receive the premium program; (2) the command code for switching of the converter 110; and (3) a divisor or tuning factor for selecting the input channel from among the premium channels.

All signals which are present at the input 111 of the converter 110 are boosted by amplifier 115 to improve signal quality at the output 112 of the converter. After being amplified, the signals pass to a directional coupler 116 which provides a coupled signal to FSK demodulator 117 while passing the actual signal to a low loss resistive power splitter 118. The coupler 116 of the preferred embodiment is a surface mount ferrite transformer device although those skilled in the art will appreciate that many other equivalent devices could be utilized.

The FSK demodulator 117 includes a bandpass input filter and a demodulator circuit. In the preferred embodiment, the band pass filter is tuned to 74.4 MHz with a band width of 2 MHz. After being filtered, the signals are transferred to a demodulator circuit which initially translates the signals to an intermediate frequency (IF) of 10.7 MHz where they are further filtered to remove undesired noise and signals. Then, the signals are demodulated through a quadrature detector which provides a buffered and demodulated signal. The demodulated signal is then shaped through comparators to produce a CMOS compatible signal output. The output is coupled to the converter controller 119.

In addition to coupling signals for demodulation in FSK demodulator 117, the coupler 116 also allows signals to pass to the resistive power splitter 118. The splitter 118 divides the passed signal into three separate signal paths. As will be explained in detail below, one signal path is utilized to perform overload detection, another signal path couples the non-premium signals to the output 112 of the converter 110, and the final signal path is utilized to process the premium signals. As shown in FIG. 3, the signal overload detector 120 receives one branch of the signals separated by the splitter 118. The detector monitors the signals to make sure that the signals and, thus, the output 112 of the converter 110 do not exceed the maximum power permitted by the Federal Communications Commission.

The low pass notch filter 121 receives another branch of signals from the resistive power splitter 118. The purpose of the filter 121 is to attenuate the signals on frequencies relating to channels 60 and above (lower edge of band is 450 MHz) while passing those signals on frequencies relating to channel 59 and below. It will be understood that different sets of signals could be passed by the filter 121. In the preferred embodiment, a three section elliptic low pass filter design is utilized, although those skilled in the art would recognize that many other low pass designs could be utilized. The signals passed by filter 121 are delivered to FET (field effect transistor) switch 122 which will be explained in greater detail below. The FET switch usually permits the signals from the filter 121 to pass to the output 112 of the converter 110.

The third branch of signals from the splitter 118 generally comprises those signals on the premium channels 60 and above which are modulated by modulators 135. The signals are delivered to an image and low reject filter 123 which is essentially a counterpart to the filter 121. The filter 123 attenuates those signals at frequencies relating to channel 59 and below and permits those signals present at frequencies relating to channel 60 and above to pass without much, if any, attenuation.

After being filtered, the signals relating to channels 60 and above (the premium channels) are delivered to the first converter 124. As noted above, the modulators 135 scramble the signals they receive by inverting the spectral sense of the video, audio and color carriers. The converter 124 un-scrambles the signals present on a selected input channel and translates them to an IF centered at 924 MHz. The first converter 124 has a first local oscillator which operates in the approximate frequency range of 1305 MHz to 1461 MHz and is phase locked by the synthesizer 125 so that it has the capability to tune to input channels which range from channels 60 to 86. The exact operating frequency (i.e., the input channel) of the first converter's local oscillator is determined by divisor factors with which the converter controller 119 retrieves from memory.

The ceramic filter 126 is a low cost, three section, ceramic bandpass filter with a center frequency at the IF, which is 924 MHz in the preferred embodiment. The demodulated IF signal is next passed through the ceramic filter 126. Other mixing products, such as the opposite sideband signals are eliminated from the signal spectrum that appears as the input to the second converter 127 by this filter 126, thus greatly minimizing the generation of unwanted spurious mixer products.

The second converter 127 translates the IF signal centered at the IF to the output channel frequency. To accomplish this, the second converter 127 has a second local oscillator which is phase locked using the same method which phase locks the first local oscillator. Unlike the first converter 124, however, the second converter 127 does not invert the spectrum of the output signal, and thus the required signal orientation is maintained. The exact operating frequency of the second converter's local oscillator is determined by divisor factors that the converter controller 119 receives from the control signal.

The output from the second converter 127 is first filtered by lowpass filter 129 to eliminate high frequency energy and then routed to the output FET switch 122. The converter controller 119 and the signal overload detector 120 control whether the FET switch 122 passes to its output port the signals received from the second signal path (carrying channels 2–59) and the third signal path (carrying the selection chosen by the viewer). In appropriate instances, the converter controller 119 of the overload detector 120 may activate the FET switch 122 to prevent signals from reaching output 112.

The converter controller 119 additionally monitors the operating condition of a number of the most critical circuits and circuit functions (such as the lock status of the internal tuning oscillators, presence of the FSK control signal, presence of an abnormally high input signal level, etc.). The presence of abnormal conditions which may be displayed by a unique flashing pattern from a green LED indicator 116. Under normal operating conditions the LED 116 will be "on" but not flashing.

The converter controller 119 further sends control signals to the PLL synthesizers 125 and 128 to set the up and down conversion frequencies for the processed signals. As shown, the converter controller 119 is coupled to the synthesizers 125 and 128 via bus 130. The preferred manner of initially programming the converter controller 119 is by means of a computer utilizing a 7 pin mini-DIN connector (not shown) which is connected to the program test port 113. When connected to a computer which is set to operate in terminal mode, the mini-DIN connector provides a means by which to independently control and monitor the operating parameters of the converter 110.

Referring back to FIG. 2, the converter box 110 is positioned in the radio frequency path between a wall outlet and the television 100. No other connection to the television 100 is required. The converter box 110 is not required to replace any of the functions of the television 100 such as standard channel access, power, or volume. In addition, it is not necessary to mount the converter 110 on the television 100 and in the user's view.

In order to display any of the channels filtered out by the converter 110, the television 100 must be turned to channel 2, 3 or 4, depending on whichever channel is appropriate for the given region. This channel is referred to as the "preview channel." In its default mode, the converter 110 is configured to allow the previews from the preview generator 150, along with regular TV, to be routed through the FET switch 122 to the television 100 prior to the converter box 110 being directed to convert any other channel. In this manner, once the user turns the television 100 to the preview channel for using the entertainment and information system 60, the television channel does not have to be changed again.

Referring to FIG. 4, the preferred embodiment of the headend controller 180 is a one piece multiple function device comprising a driver 184, an infra-red controller 186, volatile memory 188, a menu generator 189 and a matrix switch 190. The headend controller 180 accomplishes the following tasks, under control of the system controller 140: (1) function control of the VCP's 136 using simulated infra-red remote control commands, (2) the generation of menu screens and (3) the switching of menus, audio and video ("A/V") signals and control signals to selected channel modulators 135. An RS-232 serial cable 191 couples the headend controller 180 to the system controller 140.

The system driver 184 converts the control data that it receives from the system controller 140 into an RF signal carried at 74.4 MHz. The resulting RF signal is coupled by the cable 134 to the in-room converters 110 after it is combined with the regular cable television signals.

The infra-red controller 186 includes multiple infra-red transmitters that are coupled to the individual VCP's 136. When a command is sent to the infra-red controller 186, the controller 186 retrieves the appropriate infra-red ("IR") codes that correspond to the command and then sends the codes to the selected VCP 136. These codes are downloaded by the system controller 140 into volatile memory 188 at system startup via the RS-232 serial cable.

The matrix switch 190 is provided with dimensions depending on the system's intended peak usage. In the preferred embodiment, the matrix switch 190 is a 24×8 matrix switch. The system controller 140 can thus route any one of 24 inputs to one or all of the 8 outputs. These inputs are divided into three groups in the preferred embodiment: (1) eighteen of the inputs are coupled to the VCPs' 136 audio and video outputs, (2) four of the inputs are hard wired to the text generators, and (3) two of the inputs are coupled to external video backdrop generators.

In the preferred embodiment, the menu generator 189 comprises text generators and video backdrop generators (both not shown). The text generators are piggy-back boards that plug into a main integrated circuit board of the integrated headend controller 180. The text generators display text on a television screen 100. To generate a menu on a particular television 100 screen, the system controller 140 commands one of the text generators to generate a message such as a movie list. The text is then combined with a video backdrop from one of the video backdrop generators, thus forming a menu to be displayed on the television 100. To display the generated menu, the system controller 140 routes the signal generated by the menu generator 189 through the switch 190 to the appropriate modulator 135.

The headend controller 180 operates as follows when a user selects a movie for viewing. The system controller 140 receives the user's designation via telephone 101 and accessory 102, the PBX 250, and the interactive board 260 as described below. The controller 140 then commands the headend controller 180 to start playing a particular VCP 136 carrying the selected movie. After retrieving the appropriate IR code from volatile memory 188, the headed controller 180 transmits that code to the designated VCP 136. If this command is not executed, an error message will be generated. The error may be corrected either locally, or by an operator 30 as described in more detail below. In response to the commands of the system controller 140, the headend controller 180 also generates a control signal which is modulated by the system driver 184 and transmitted over the cable 134. The command is utilized by the intended converter 110 as described above to down convert the appropriate signal. Thus, as the VCP 136 plays the requested movie, the generated video signal is routed to the appropriate television 100 for viewing.

Figure 5:
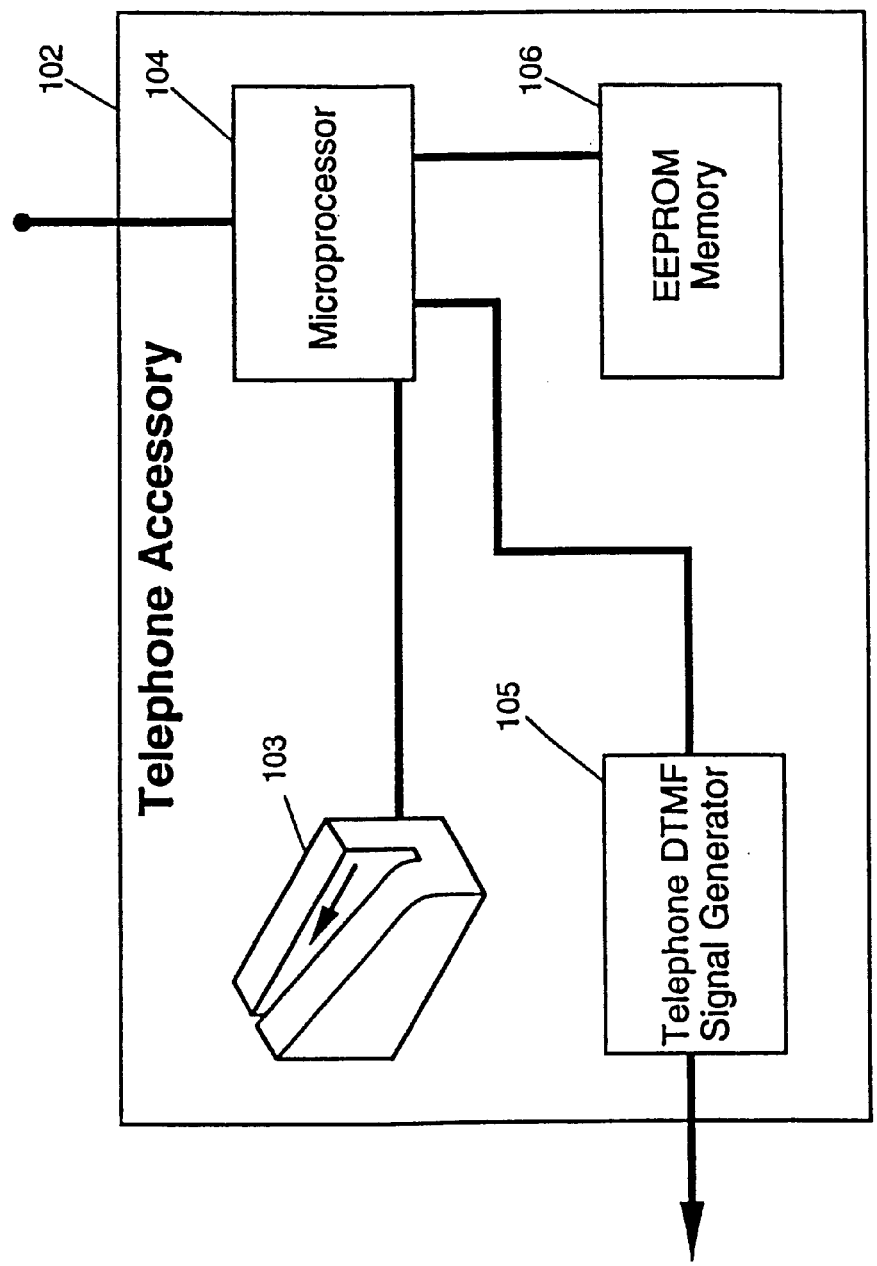
FIG. 5 is a schematic diagram of the preferred telephone accessory and its components.

The current preferred embodiment of the telephone accessory is shown in the schematic diagram of FIG. 5. The telephone accessory 102 includes a magnetic card reader 103, a microprocessor 104, a microprocessor controlled telephone signalling generator 105 (also called a "DTMF generator"), an EEPROM memory device 106, and pushbuttons (not shown). The accessory 102 utilizes the DTMF generator 105 to communicate through the telephone 101 in the particular user's room 90. Although the card reader 103 is attached to the telephone 101 in the preferred embodiment, communication may be accomplished by a wireless means such as by a wireless handheld card reader 103 in another embodiment. An embodiment of the telephone accessory 102 and the telephone system is described in a copending application Ser. No. 08/429,954, filed Apr. 27, 1995, which is incorporated herein by reference.

Operations

Referring back to FIG. 2, the process of selecting a video is begun after the user is directed either by previews on the in-room television 100 or by cues at or near the in-room telephone 101 or television 100 to access the system 60 by pressing the appropriate button on the telephone accessory 102. The telephone accessory 102 then dials a predefined extension. Codes for this extension are retrieved from memory 20. These codes are then used to direct the signal generator 105 to produce tones that represent a telephone number to be dialed and connect the telephone line 72 through the in-house PBX 250 to one of the lines 66 of the system 60. After connection is complete, the signal generator 105 transmits the room's 90 unique identification code to the system controller 140, by way of interactive board 260, which code determines which of the converters 110 connected to the room's 90 television set 100 corresponds to the particular telephone connection. No further identification signal is sent by the telephone accessory 102 during selection of a video. The user is then cued by the system controller 140 to depress appropriate buttons on the telephone 101. These tones produced thereby represent user responses to the controller 140 cues.

To generate cues, the controller 140 activates one of the menu generators 189 and routes the generated menu through the headend controller 180 for modulation by the RF modulator 135 selected by the controller 140 from among those that are not currently in use. If a modulator 135 is available, then the menu is transmitted over cable 134 on the channel that the selected RF modulator 135 is set for. The controller 140 also provides a control signal on the control channel which directs the converter 110 in the user's room 90 to switch its output 112 from non-premium channels to a premium channel which is received by the converter 110 on the channel of the selected RF modulator 135, as described above. If all modulators 135 are being used, then the user is presented a voice message explaining that the system is unavailable and that he or she should try again later. The number of system channels, or modulators 135 used is based on the peak usage and economic realities of each particular installation, thus providing a flexible system that can be scaled accordingly.

Once the user's in-room converter 100 is tuned to the RF channel that the system controller 140 has assigned and connected to the menu generator 189, the controller then sends to the menu generator 189 a data file containing the available movies. This list is then displayed on the user's television 100. During these operations, the television set 100 remains on the preselected channel 2, 3 or 4, although the converter changes the channel actually seen on the television 100 to the channel of the RF modulator 135, as noted.

Next, the controller 140 prompts the user to push a particular button of the telephone keypad to indicate the user's selection. For example, the initial menu screen may request the user to push "1" for adventures, "2" for dramas, "3" for comedies, etc. A tone is generated when a telephone keypad button is pushed which is received by the interactive board 260 and communicated to the controller 140. The controller 140 then controls the menu generator 189 to generate a new screen which presents the user a menu of movies from which to choose a movie by utilizing the telephone 101. A dialogue continues until either a movie is played or the dialogue is terminated.

After a selection has been entered, the interactive communication board 260 sends a voice prompt to the user with directions to initiate payment by sliding a credit card through the magnetic card reader 103. The reader 103 sends the user's credit card number and expiration date to the interactive board 260. The controller 140 receives this information and then determines if the card number is valid and not expired. If the user's credit card passes the initial standard verification criteria, then the controller 140 starts the movie and sends a voice prompt to the user explaining that the movie has started and that he or she should remain on the line to ensure that the movie is the same movie that was ordered. The user has sixty seconds to change or cancel the rental selection. If there is a problem with the movie or the user chooses to cancel the movie, the user presses a key on the telephone keypad as directed by a voice prompt. While the movie is started and the user is verifying that the movie is correct, the controller 140 contacts a credit card exchange system to verify that the user's credit card is valid and to reserve the movie rental charge on the user's credit card account.

The credit card exchange system will either approve or deny the movie rental charge. If the charge is approved, the movie rental selection process is completed and the movie is played to completion. The centralized approval process and detail settlement of such charges will be discussed in more detail below in the section entitled "Centralized Billing". If the charge is initially denied by the credit card exchange system, the movie will be interrupted. If the user is still on the telephone with the interactive board 260, the user will be sent a voice prompt explaining that the credit card was denied and that another credit card may be used or a cash payment can be made to the hotel's front desk attendant. If the user is no longer on the telephone with the interactive board 260, the movie will be stopped and a message will be displayed on the user's television 100 explaining that there was a problem with the credit card. The user will then be given the option of pressing the movie button on the telephone accessory 102 again so that another credit card can be tried. This feature of the present invention is discussed in greater detail below in the section entitled "Communication system".

To make a cash purchase, the user informs the front desk attendant who then collects payment and contacts the system controller 140 to apply a credit to the user's room 90 by dialing the interactive communication board 260. When contacting the system controller 140, the attendant enters an appropriate function code, a password, and information regarding the user's room 90.

When payment is approved and the user chooses not to cancel the movie selection, the interactive board 260 directs the user to hang up the telephone 101 and the movie is played. At the end of the movie, the controller 140 directs the converter output 112 to switch back to non-premium channels, with previews being displayed on the preview channel.

It is noted that during the selection process, the user may be given the opportunity to join a movie already in progress if every copy of the movie is already being played. If the user elects to join a movie that is already in progress, then the user's in-room converter 110 must be tuned to the RF channel which the VCP 136 playing the movie is assigned to. To do this, the controller 140 issues a command to the user's in-room converter 110 via the RF control data channel to tune to the same channel that the selected movie is tuned to. The controller 140 accomplishes this by retrieving the room's 90 identification which it received as a result of the user's initial contact with the system 60 as described above. The controller 140 also retrieves the address of the appropriate video cassette player 136 from a system status file. Once the user's in-room converter 110 is tuned, the movie is routed through the headend controller 180 and eventually to the user's television 100. As demonstrated, only one channel is utilized to transmit the signals of any particular video cassette player 136 at any particular time. Accordingly, more users may be accommodated over a given number of channels.

When the rented movie ends, the controller 140 must reset all appropriate hardware components to their normal non-playing states. This includes switching the user's in-room converter 110 back to outputting non-premium channels, issuing commands to the video cassette player 136 to stop playing and to rewind the movie, and updating RF channel status in the system status file.

Although the current application employs VCP's 136, digital text and video backdrop generators as a menu generator 189, and a PC board digital video player as a preview player 152, other input devices could be employed. The following list of input devices provides an example of just a few of the input devices that may be used by this system. These devices include digital or analogue devices, CD-ROM, laser discs, large capacity file servers, DVD, disc drives, any devices capable of rapid storage and retrieval of information or images (still or continuous, with sound or without), other on-site computers, and other external networks or satellite networks which provide the same services remotely.

Similarly, although the present embodiment employs a television 100 as the preferred output device, any device capable of transmitting audio, visual, sensory or multimedia data may be used. (The term data herein refers to any audio, visual or sensory data, information, or signals.) Smart TV's (or microprocessor controlled TV's), may also be employed as an output device. In the preferred embodiment, the system 60 is operated under the control of a microprocessor based computer 140, which computer is selected based on the capacity and speed required to serve the intended volume of users. However, to enhance system 60 performance, multiple computers may be used. For example, one computer may be dedicated to handling remote communications while the other computer controls the rest of the entertainment and information system 60. Furthermore, while the accessory 102 and converter 110 utilize PIC 16C84 microprocessors in their preferred embodiments, other more powerful and flexible microprocessors may be utilized if economics so warranted.

In addition, the system 60 has the ability to offer a listing of information relating to local merchants and to display this information on hotel television screens 100. The system 60 can be configured to display a listing of all local food vendors, or categorical information such as a listing of all Italian restaurants. The system 60 allows for selection of detailed information such as a display of menu items, prices, ordering information, etc. Based on the selections made by the user, the system controller 140 may utilize PBX 250 to communicate with the selected merchant to order goods or services for the user. Such services and goods would include such things as the delivery of food stuffs, etc. Side features may be implemented in accordance with the following disclosure concerning the communication features of the present invention.

The following is a detailed description of the preview communication features of the present invention.

Preview System

As explained in connection with FIG. 2, the preview generator 150 provides previews comprising small clips of the feature films that are available for rent. A typical preview will be ten to twelve minutes in length and will have seven or eight movie clips intermixed with a variety of miscellaneous advertisements, instructions, special promotions, etc.

Figure 6:
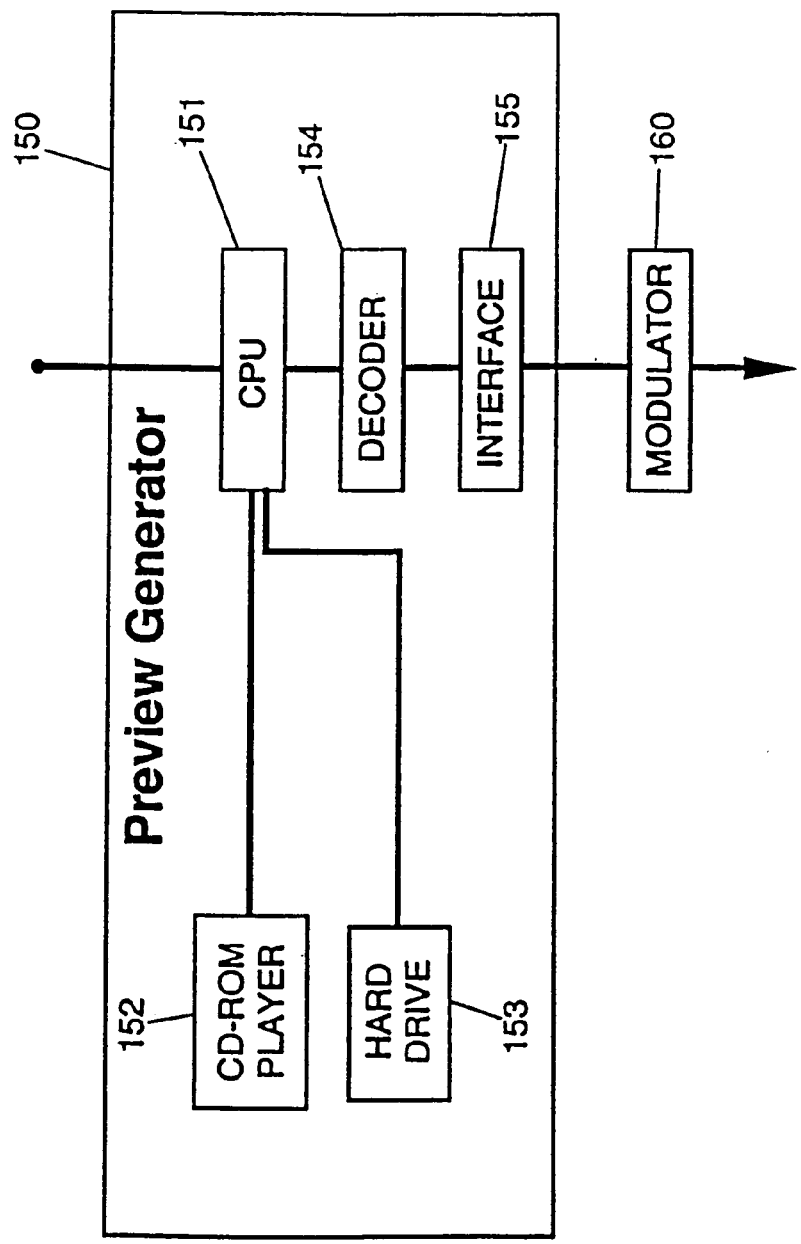
FIG. 6 is a schematic diagram of the preview system in the preferred embodiment.

FIG. 6 shows the configuration of the preferred embodiment of the preview system in greater detail. The microprocessor controller 151 is coupled to a CD-ROM player 152 and a hard drive 153. A decoder 154 is coupled to an interface 155 which is coupled to modulator 160 for modulating the signals provided by the preview generator 150.

Previews are stored as individual files in the memory 153 of the preview generator 150 in a compressed format. Compressing the A/V (audio/visual) data permits the data to be stored in segments small enough to fit on a standard computer storage medium. The preferred format is the Motion Picture Expert Group ("MPEG") format which is an industry standard for digital video sequences. The preferred memory device 153 is a hard disc drive, although the memory 153 may be an electronic, magnetic or optical memory device.

At the direction of the CPU 151, the compressed audio/visual ("A/V") data files are retrieved from the memory 153 and decompressed. In the preferred embodiment, the decoder 154 utilizes a hardware board driven by software sold by Optibase called PC Motion to perform the decompression of the digital data. After the A/V data file is decompressed, the data is transmitted to the modulator 160 through interface 155. Once a particular preview file is accessed from the memory 153 and played, the CPU 151 controls decompression and transmission of the next data file in a predetermined sequence.

The master CD is initially encoded at a professional production facility with a variety of segments or clips which may be used at a particular installation 20. Then, during the monthly tape exchange process, the master CD-ROM disks may be provided to the CD-ROM players 152. Of course, any particular installation does not utilize each of the files on the master CD-ROM. Instead, the remote servicing terminals 40 (see FIG. 1) are utilized by the operators 30 to direct the system controller 140 as to which of the previews on the master CD-ROM disk should be read and stored in the hard drive 153. The servicing terminal 40 further directs the system controller 140 as to the order in which the files are to be played by the preview generator 150. The information regarding the appropriate files for each system 60 and the order that the files are to be played (the "programming information") is stored as profile data in the hard drive 153. It is noted that the programming of the system controller 140 in this regard may be performed by a human operator 30 or it may be done automatically.

In operation, the CPU 151 of the preview generator 150 retrieves the compressed audio-video file stored in memory 153 and sends it to the decoder 154. The decoder 154 expands the compressed data and sends the A/V signals via interface 155 to RF modulator 160. The modulator 160 transmits the RF signals through the hotel CATV cable 134 on the designated movie preview channel (channel 2, 3 or 4). Any television 100 tuned to the preview channel will see the preview clips as they are decoded and transmitted. As soon as one preview clip has ended, the software opens the next file and plays it. When the last MPEG file in the sequence has been played, the process is repeated, thus creating continuous preview playback.

In keeping with the invention, the preview generator 150 includes the ability to advertise for local merchants, such as food vendors. The system can provide audio visual advertisements on television 100 either on request or as part of the movie preview process. In either event, the invention allows efficient customization of preview presentation at individual installations 20 by storing A/V information in digital compressed format. In particular, the system controller 140 at each particular installation 20 selectively controls which information is to be read from a master CD having a large variety of preview clips and then stores the information in the hard drive 153 for playback.

Communications

The central operations 10 is capable of communicating with each installation 20, and each installation 20 is capable of communicating with the central operations. By way of example and not limitation, the central operations may communicate with each installation via a bi-directional communication network including a public communication network, a private high-speed network, a satellite network, or any other suitable communication network.

If a satellite network is used as the communication link 80, for example, a central hub would communicate with the central operations 10 and would uplink data streams, converted (i.e., modulated) by the hub, to one or more communication satellites. The communication satellite would relay the data streams to a receiving terminal at each installation 20. The receiving terminal, which has an antenna, would downlink, or receive the satellite signals containing the data streams, reconvert the data streams (i.e., demodulate), and transmit the reconverted data streams to the system controller 140. Note that the system controller 140 is capable of communicating back with the central operations 10 via the satellite network. Likewise, if a public communication network or a private high-speed network is used as the communications link 80, a similar bi-directional communication link is achieved between the central operations 10 and each installation 20.

In an exemplary operation, an incoming call to the entertainment and information system 60 is automatically answered by a modem, which is provided on line 62. When a call is received, a hardware interrupt is set indicating to the system controller 140 that an operator 30 is trying to connect. Once the modem connection is established between the remote system and the system controller 140, the responsibility for managing the communications between the two systems is transferred to a communication software module, which coexists with the system application software and enables the system controller 140 to perform multitasking functions without interrupting the running processes. The module is a terminate-and-stay-resident ("TSR") program, which remains idle until an incoming call is received by the modem of the entertainment and information system 60. When the controller 140 receives an incoming call, the communication module requests that the calling system 10 provide a password. If the calling system 10 does not send the expected password within a predetermined time, the communication module terminates the connection.

If the calling system 10 does supply the expected password in time, the communication module permits the calling computer to perform a number of functions including remote servicing and maintenance. In addition to providing for response to incoming calls, the communication system may initiate calls to remote operations such as in connection with billing 50 described in the section entitled "Centralized Billing" below.

Remote Servicing and Maintenance

In the remote servicing and maintenance mode, a service representative 30 may use the communication module to perform diagnostic and remote service on the entertainment and information system 60. In addition, the remote control mode may be utilized by any technical support personnel 30 who needs to monitor the activity of a particular entertainment and information system 60, or generally by any type of operator 30 for any reason.

Periodically, a user may have difficulty renting a movie and may wish to speak to a service representative 30 for guidance. In other situations, the user may notice a problem with the entertainment and information system 60 which he or she wishes to report. In an exemplary embodiment of the present invention, the user may press a button on the telephone accessory 102 which automatically dials a toll-free number and connects the user to a service representative 30. The service representative 30 may be able to assist the user over the telephone 101 or may decide that the particular entertainment and information system 60 must be contacted utilizing the remote servicing terminals 40.

As indicated above, once connected to the system 60, the service representative 30 can remotely probe the system controller 140 to perform diagnostic operations. For example, in certain instances the hotel management may move a particular telephone 101 and accessory 102 from one room to another without informing the vendor. Because the system 60 relies on the identification code stored by the telephone accessory 102 to locate the particular room in which to send information or entertainment, the system 60 will send the entertainment and information to the wrong room 90 if the telephone accessory 102 is moved.

There are two methods of performing maintenance operations remotely. The first method utilizes the communications software module which allows central service terminals to connect to and take control of the entertainment and information systems 60 at remote locations. The second method allows central service representatives to contact the hotel front desk and request to be transferred to the interactive (Dialogic PCB) board 260. Using voice prompts and the telephone keypad, the central service representatives are able to perform system queries and maintenance. The second method is an alternative to the first method. In the event that the modem is not functioning or the modem telephone line is not functioning, the system 60 can still be controlled remotely using the interactive board 260.

In diagnosing a problem, the service representative 30 may use the remote servicing terminals to control the system controller 140 to sequentially direct the converter boxes 110 to display a menu image generated by a particular menu generator 189. Procedurally, the operator 30 commands the system controller 140 to set a menu generator 189 to an available frequency. Then, the operator 30 directs the system controller 140 to send control commands to each of the converter boxes 110 sequentially until the menu appears on the users television 100. At that point, the operator 30 is able to reprogram the system status file stored by the system controller 140 to associate the user's room 90 with the correct converter 110 and the correct accessory 102.

Centralized Billing

As explained in connection with FIGS. 2 and 3, before a movie or other service is provided to a particular user, the system controller 140 obtains authorization from the credit bureau. However, the entertainment and information system 60 does not actually bill the user's credit card company at the time of authorization. To complete the transaction and cause the authorization system to bill the user's credit card company, a separate settlement transaction must be sent to the authorization company which confirms the sale and posts the charge to the user's credit card account.

As each authorization is obtained for each credit transaction, the system controller 140 stores the relevant information in memory. The stored information includes the credit card number, the amount, the authorization code and other information such as the date of sale. On a periodic basis, the system controller 140 will utilize its communication line 64 to establish a communication link 80 with central billing 50 of the remote central operations 10. In the preferred embodiment of this invention, the controller 140 communicates with central billing 50 to transmit the billing data files. After processing the data, central billing 50 automatically posts the charges to the individual credit accounts. In an alternative arrangement, a service representative could visit the location of the system and download the billing information on site.

The foregoing description of various preferred embodiments of the invention has been presented for purposes of illustration and description. It is not intended to be exhaustive or to limit the invention to the precise forms disclosed. Obvious modifications or variations are possible in light of the above teachings. For example, it will be understood by those skilled in the art that orders may be placed at local merchants utilizing the operations described for central billing and a fax modem.

The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method of remotely controlling the distribution of video signals at multiple local installation systems, the method comprising the steps of:

providing a remote central operations system;

providing a system controller at each of the multiple local installations;

providing a plurality of video sources at each of the multiple local installations;

providing a plurality of video monitors at various locations in each of the local installations for receiving video signals from the plurality of video sources;

providing a telecommunication link between the remote central operations system and each of the system controllers;

receiving remote communication signals by at least one of the system controllers from the remote central operations via the associated telecommunication link, the system controller processing the remote communication signals without disrupting any other transmission of video signals from the video sources to the monitors; and transmitting signals from the system controller to the remote central operations system in response to the system controller processing the remote communication signals.

2. The method of claim 1 wherein the telecommunication link is a satellite network.

3. The method of claim 1 wherein the telecommunication link is a public communication network.

4. The method of claim 1 wherein the telecommunication link is a private communication network.

5. The method of claim 1 further comprising the steps of receiving and storing payment information in memory associated with the system controller, periodically establishing a telecommunication link with a remote central billing system, and transmitting the stored payment information to the remote central billing system.

6. The method of claim 1 further comprising the steps of receiving maintenance commands by the system controller from the remote central operations, the system controller responding to the maintenance commands by performing diagnostic tests and reporting results of the diagnostic tests to the remote central operations.

7. The method of claim 1 wherein the telecommunications link is a telephone line.

8. An entertainment and information distribution system comprising;

a remote central operations system;

a plurality of local installation systems, each local installation system including a plurality of information and video sources providing video signals;

a system controller at each of the local installations systems;

a plurality of video monitors at various locations in the local installations systems, the video monitors receiving video signals from the video sources;

a telecommunication link between the remote central operations system and the system controller;

whereby the system controller receives remote communication signals from the remote central operations via the telecommunication link and processes the remote communication signals without disrupting any other transmission of video signals to the monitors, the system controller further transmits signals to the remote central operations system in response to the system controller processing the remote communication signals.

9. The entertainment and information distribution system of claim 8 wherein the telecommunication link is a satellite network.

10. The entertainment and information distribution system of claim 8 wherein the telecommunication link is a public communication network.

11. The entertainment and information distribution system of claim 8 wherein the telecommunication link is a private communication network.

12. The entertainment and information distribution system of claim 8 wherein the system controller receives maintenance commands from the remote central operations, responds to the maintenance commands by performing diagnostic tests, and reports results of the diagnostic tests to the remote central operations.

13. The entertainment and information distribution system of claim 8 wherein the system controller includes a memory for receiving and storing payment information, the system controller periodically establishing a telecommunication link with a remote central billing system and transmitting the stored payment information for further processing.

14. The entertainment and information distribution system of claim 8 further comprising;

a plurality of telephones and accessory devices coupled to the system controller, the system controller issuing cues to the plurality of telephones and receiving signals from the accessory devices in response to the cues.

15. The entertainment and information distribution system of claim 13 wherein the system controller automatically establishes the telecommunication link with the remote central billing system.

16. An entertainment and information distribution system comprising:

a remote central operation system installed at a remote central location;

a local installation system installed at a multi-user establishment, the local installation system comprising a connection to a plurality of information and video sources, the video sources providing video signals;

a system controller at the multi-user establishment;

a plurality of video monitors at various locations in the multi-user establishment, the video monitors receiving video signals from the video sources;

whereby the local installation system is configured to communicate in a two-way manner with the remote central operation system so as to allow billing information to be provided to the remote central operation system.

17. The system of claim 16, wherein at least a portion of the plurality of the video sources are stored remotely.

18. The system of claim 16, wherein the connection to the plurality of information and video sources comprises a connection to an external network.

19. The entertainment and information distribution system of claim 16, wherein the local installation system is configured to communicate in a two-way manner so as to allow maintenance of the local installation system by the remote central operations system.

20. The system of claim 16, wherein the multi-user establishment is selected from the group consisting of a hotel, a motel, a hospital, a school, and an airplane.

* * * * *